United States Patent
Yocum et al.

(10) Patent No.: US 6,308,228 B1
(45) Date of Patent: Oct. 23, 2001

(54) SYSTEM AND METHOD OF ADAPTIVE MESSAGE PIPELINING

(75) Inventors: Kenneth G. Yocum; Jeffrey S. Chase, both of Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/197,598

(22) Filed: Nov. 23, 1998

(51) Int. Cl.[7] .................................................. G06F 13/00
(52) U.S. Cl. ............................ 710/52; 710/30; 710/131; 709/250
(58) Field of Search ........................ 709/250; 710/52–57, 710/29–35, 129–131

(56) References Cited

U.S. PATENT DOCUMENTS

| | | | |
|---|---|---|---|
| 4,258,418 | * 3/1981 | Heath | 710/53 |
| 4,860,193 | * 8/1989 | Bentley et al. | 710/55 |
| 5,121,479 | * 6/1992 | O'Brien | 710/34 |
| 5,664,116 | * 9/1997 | Gaytan et al. | 709/234 |
| 5,671,445 | * 9/1997 | Gluyas et al. | 710/53 |
| 5,732,094 | * 3/1998 | Petersen et al. | 714/805 |
| 5,864,713 | * 1/1999 | Terry | 395/872 |
| 5,944,802 | * 8/1999 | Bello et al. | 710/52 |
| 5,991,835 | * 11/1999 | Mashimo et al. | 710/58 |
| 6,014,722 | * 1/2000 | Rudin et al. | 710/240 |
| 6,015,086 | * 1/2000 | Ritchie et al. | 231/2.5 |
| 6,094,695 | * 7/2000 | Kornher | 710/56 |

FOREIGN PATENT DOCUMENTS

9400935 * 1/1994 (WO) .

OTHER PUBLICATIONS

Wang et al., "Modeling Communication Pipeline Latency", *Proc. of ACM International Conference on Measurement and Modeling of Computer Systems, Sigmetrics*, Jun. 1998.
Yocum et al., "Cut–Through Delivery in Trapeze: An Exercise in Low–Latency Messaging ", *Proc. Of Sixth IEEE International Symposium on High Performance Distributed Computing*, Aug. 1997.
Dittia et al., "The APIC Approach to High Performance Network Interface Design: Protected DMA and Other Techniques", *Proceedings of INFOCOM '97*, Apr. 7–11, 1997.
Lauria et al., "Efficient Layering for High Speed Communication: Fast Messages 2.x*", *IEEE*, Jul. 1998.
Tezuka et al., "PM: An Operating System Coordinated High Performance Communication Library", *Real World Computing Partnership*, 1997.
Prylli et al., "Modeling of a High Speed Network to Maximize Throughput Performance: the Experience of BIP over Myrinet", Sep. 26, 1997.

* cited by examiner

Primary Examiner—Christopher B. Shin
(74) Attorney, Agent, or Firm—Jenkins & Wilson, P.A.

(57) ABSTRACT

A system and method termed adaptive message pipelining in which two or more data paths are joined by a data movement device. The data movement device has a data path controller for each incoming and outgoing data path. Adaptive message pipelining is a dynamic policy which adjusts between a store and forward data delivery method and a cut through delivery of data based upon network and I/O bus contention in order to decrease latency and maximize system throughput.

15 Claims, 8 Drawing Sheets

SYSTEM AND METHOD OF ADAPTIVE MESSAGE PIPELINING

TECHNICAL FIELD

The present invention relates to a technique for reducing network latency of messages while delivering high throughput.

BACKGROUND AND RELATED ART

Latency of messages in a network is typically linked to high end-to-end performance for applications. However, certain computer applications such as network memory or file access require low latency for large messages and high bandwidth or throughput under load in order to perform optimally. Reconciling these conflicting demands requires careful attention to data movement across data buses, network interfaces, and network links.

One method of achieving high data throughput is to send larger data packets and thus reduce per-packet overheads. On the other hand, a key technique for achieving low latency is to fragment data packets or messages and pipeline the fragments through the network, overlapping transfers on the network links and I/O buses. Since it is not possible to do both at once, messaging systems must select which strategy to use.

It is therefore desirable to automatically adapt a fragmentation policy along the continuum between low latency and high bandwidth based on the characteristics of system hardware, application behavior, and network traffic.

A number of prior art systems have used fragmentation/reassembly to reduce network latency on networks whose architecture utilizes a fixed delimited transmission unit such as ATM (asynchronous transfer mode). Fixed fragmentation is a common latency reduction scheme used in the following systems: APIC, Fast Messages (FM), Active Messages (AM), and Basic Interface for Parallelism (BIP). PM (to be discussed) appears to utilize a form of variable fragmentation only on packet transmission. Variable and hierarchical fragmentation were theoretically explored in Wang et. al. In contrast, a technique termed cut-through delivery was developed in the Trapeze Myrinet messaging system. Cut-through delivery is a non-static variable fragmentation scheme meaning fragment sizes can vary at each stage in a pipeline. The following prior-art discussion describes messaging software developed for a Myrinet gigabit network unless otherwise noted.

The design of the APIC (ATM Port Interconnect Controller) network interface card (NIC) specifies implementation of full AAL-5 segmentation and reassembly (SAR) on-chip. The APIC NIC uses fixed-size fragmentation at the cell granularity(48 byte of data), so it does not store and forward entire frames. Moreover, APIC does not adapt to host/network architectures or to changing conditions on the host or network. (See generally, Dittia et al., *The APIC Approach to High Performance Network Interface Design: Protected DMA and Other Techniques, Proceedings of INFOCOM'97*, April, 1997)

Fast Messages (FM) utilizes fixed-size fragmentation when moving data between the host, NIC, and network link in order to lower the latency of large messages. Though FM uses a streaming interface that allows a programmer to manually pipeline transfers in variably sized fragments to and from host API buffers, API data moves to and from the network interface card in fixed size fragments. Thus, it is the programmer's task to pipeline packets by making multiple calls to the application programming interface (API). FM lacks the ability to adapt automatically and transparently to changing host and network characteristics. (See generally, Lauria et al., *Efficient Layering for High Speed Communication: Fast Messages 2.x, IEEE*, July, 1998)

Active Messages (AM) uses a fixed-size fragmentation scheme to reduce latency of medium to large packets. Active messages, however, is non-adaptive and utilizes store and forward for non-bulk packets as a means for increasing throughput.

Basic Interface for Parallelism (BIP) performs static fixed-size fragmentation on the adapter. BIP, however, adjusts the fragment size depending on the size of the entire packet. When a packet is sent, fragment size is determined by a table look-up as indexed by the packet's length. BIP, while statically adaptive to packet size, does not adjust dynamically to changing host and network characteristics. (See generally, Prylli et al., *Modeling of a High Speed Network Thrughput Performance: The Experience of BIP over Myrinet*, September 1997)

The Real World Computing Partnership has developed a messaging package, also for Myrinet, called PM which implements fragmentation on the adapter for sending in a technique they term immediate sending. Double buffering is used for receiving. It is unclear from their current documents exactly what form of fragmentation constitutes immediate sending, but it appears to be a form of variable fragmentation. Moreover, their technique is limited since PM claims it is not possible to perform immediate sending on the reception of a packet. (See generally, Tezuka et al., *PM: An Operating System Coordinated High Performance Communication Library, Real World Computing Partnership*) In a theoretical approach, Wang et al. examines variable sized and hierarchical fragmentation pipelining strategies. Hierarchical fragmentation is one scheme in which a fragmentation schedule may change in different pipeline stages; it is not a static pipelining method. The theory rests on different assumptions than the present invention, adaptive message pipelining (AMP). Wang et al. assumes that $g_i$ (fixed transfer overhead) and $G_i$ (time per unit of data) values are fixed and previously known, so that both static and non-static pipeline schedules can be computed beforehand, and therefore are not adaptable to changing conditions. Neither does Wang et al. consider throughput as a goal in any of their studied pipelining strategies. (See generally, *Modeling and Optimzing Communication Pipelines, Proceedings of ACM International Conference on Measurement and Modeling of Computer Systems, SIGMETRICS*, June 1998)

Cut-through delivery, disclosed in a previously published paper, is a variable sized fragmentation scheme in which the schedules are not static for any stage of a pipeline. Cut through delivery alone, however, is unable to adjust to inter-packet pipelining and therefore cannot extract the maximum bandwidth from the underlying system hardware. (Yocum et al., *Cut-Through Delivery in Trapeze: An Exercise in Low-Latency Messaging, Proc. Of Sixth IEEE International Symposium on High Performance Distributed Computing*, August, 1997)

The approach of the present invention differs from the prior-art in several ways. First, pipelining is implemented on the network interface card (NIC), transparently to the hosts and host network software. Second, selection of transfer sizes at each stage is automatic, dynamic, and adaptive to congestion conditions encountered within the pipeline. The schedules, therefore, are variable and non-static. Third, the user of the API does not need to know anything about the hardware or network characteristics or load in order to achieve both low-latency and high bandwidth.

SUMMARY OF THE INVENTION

The present invention describes adaptive message pipelining (AMP) which is a scheme that reduces network latency of messages larger than minpulse, a pre-defined threshold amount of data, while delivering maximum throughput of high-speed networks and I/O buses under load. Adaptive message pipelining for the present invention is supported in part by the previously discussed local policy called cut-through delivery implemented within a network interface card (NIC). AMP, as opposed to ordinary cut-through delivery, automatically adjusts to congestion, yielding peak throughput for streams of messages without the need for a separate bulk data transfer mechanism.

The present invention's reference implementation was coded as a simple policy in firmware running on a Myrinet network adapter. This local policy, which will be referred to as AMP, combines low network latency with high throughput through careful pipelining of the movement of data between network links and host memory.

Adaptive message pipelining improves network performance by managing the data transfers involved in sending and receiving data. The benefits of adaptive message pipelining include a significant decrease in latency for medium to large packets when the network or I/O buses are lightly loaded, and maximized link and I/O bus utilization when the network or I/O buses are congested. Pipelining data within a frame (intra-packet) is a technique used to decrease latency. Inter-packet pipelining, i.e., pipelining between frames of data, commonly achieved through the technique of double-buffering, maximizes the throughput of the connection. Between these two extremes is a continuum of pipelining alternatives. AMP adjusts or manages the fragmentation policy across the entire range achieving its lowest latency as a result of intra-packet pipelining and its highest throughput as a result of inter-packet pipelining.

AMP utilizes the techniques of cut-through delivery and double buffering in a novel way within a local policy that manages the data transfers. The policy begins by transferring frames via cut-through delivery, but, as conditions become more congested, falls out of cut-through delivery and into store and forward in order to deliver high bandwidth.

It is therefore the object of the present invention to adapt the management policy between intra-packet and inter-packet pipelining based on host and network characteristics. Thus, messaging systems can achieve both low latency and high bandwidth or throughput.

DETAILED DESCRIPTION OF THE INVENTION

The present invention will now be described with reference to the accompanying drawings in which like reference numbers represent like elements. For reference purposes, a glossary of key terms is presented.

| TERM | DEFINITION |
| --- | --- |
| Adaptive Message Pipelining (AMP) | A scheme for reducing network latency for messages larger than a predetermined size (minpulse) while delivering maximum throughput (bandwidth) of high-speed networks and I/O buses under load. |
| Buffer | An area for data to be transferred to and from with a data path controller. In AMP, buffering is on the data movement device or DMD. |
| Cut-Through Delivery | A variable sized fragmentation scheme in which schedules are not static for any stage of a pipeline. |
| Data Movement Device (DMD) | Any device connected to two or more data paths, on which resides buffering for data and data path controllers. Examples include network interface cards, CPUs, network switches, etc. |
| Data Path Controller (DPC) | Any device which controls the movement of data along a data path. e.g., DMA engine, P I/O controller, etc. |
| Data Path | Any path along which data travels. i.e. memory buses, I/O buses, network links, etc. |
| Delimited Fragmentation | Any fragmentation scheme in which each fragment of the original frame is also transferred as a frame. Also referred to by those skilled in the art as packetization. |
| Fixed Fragmentation | A fragmentation scheme in which each fragment is the same size. |
| Fragmentation Schemes | Any method by which a frame of data is fragmented into, usually, smaller sized transfers in order to pipeline the movement of data across multiple data paths. |
| Frame | A delimited unit of data of any length such as a packet, message, I/O block, etc. |
| Inter-Packet Pipelining | Pipelining between two separate packets or frames commonly achieved through double buffering. |
| Intra-Packet Pipelining | Pipelining within one packet or frame commonly achieved with fixed size fragmentation. |
| Minpulse | A pre-defined threshold amount of data. Cut-through delivery waits until a minpulse amount of data has arrived on the DMD before initiating an outgoing data path controller transfer. |
| Static Fragmentation | The schedule of fragments for a frame is the same for each stage in the pipeline. The schedule can either be fixed or variable. |
| Variable Fragmentation | A fragmentation scheme in which each fragment can be a different size. |

Adaptive message pipelining (AMP) is a technique which minimizes latency and maximizes throughput when transferring data across multiple data paths. AMP is a unique combination of three techniques or policies: (i) store and forward, (ii) cut-through delivery, and (iii) double buffering.

Store and forward is a data movement technique which requires that an entire frame of data completely finish a current stage transfer before beginning a transfer to the next stage. The chief benefit of store and forward is increased throughput due to reduction in overheads. Cut-through delivery is a technique used to decrease latency in which a frame of data need not complete its current stage before parts of the frame can be transferred to the next stage. This is an attribute of cut-through delivery called intra-packet pipelining(defined above). Double buffering is a technique using two or more data buffers that permits a store and forward architecture to overlap the transfer and emission of two data frames simultaneously. This is sometimes referred to as inter-packet pipelining.

Figure 1:
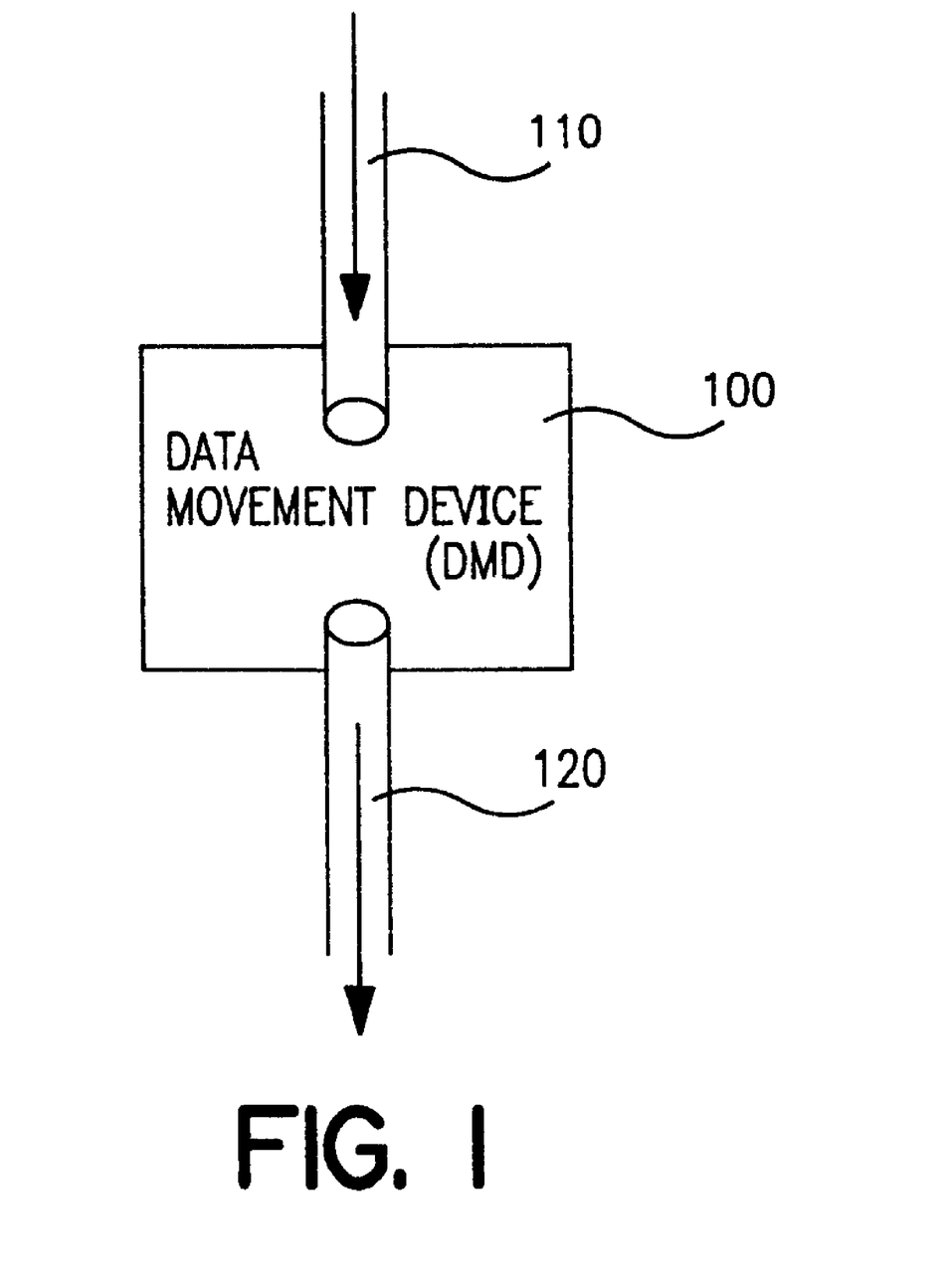
FIG. 1 is a schematic diagram illustrating the flow of data through a data movement device (DMD) as it receives data from an incoming data path and sends it out through an outgoing data path.

FIG. 1 illustrates an example of data flow through a data movement device (DMD) 100 as it receives data from an incoming data path 110 and sends it out through an outgoing data path 120. While only one incoming and one outgoing data path have been illustrated in FIG. 1, a DMD can have multiple data paths. Adaptive message pipelining is essentially the policy of handling the data as it enters and exits the data movement device 100. A data movement device, for purposes of the present invention, is a device which joins data paths. A data path is any path along which data travels. Moreover, a data movement device possesses data buffer(s), data path controller(s), and a mechanism by which to be notified when a data path controller has completed a data transfer (interrupt or polling capabilities are sufficient). The data movement devices of the present invention also have the ability to utilize data that has arrived as a result of a transfer in progress. Another capability of the data movement device is the ability to monitor the progress of a data path controllers transfer, i.e., to note the amount of data transferred to date.

A data path controller is the mechanism by which data is transmitted across a data path. Data path controllers include, but are not limited to, direct memory access devices or programmed I/O devices. Data path controllers must be able to initiate concurrent transfers of data on data paths.

Thus, data path controllers according to the present invention have the ability to (i) initiate and terminate concurrent transfers, with respect to the data movement device, (ii) notify the data movement device of a completed transfer, (iii) allow the data movement device to utilize data that has arrived as a result of a transfer in progress, (iv) monitor the progress of a transfer, and (v) delimit frames of data.

Figure 2:
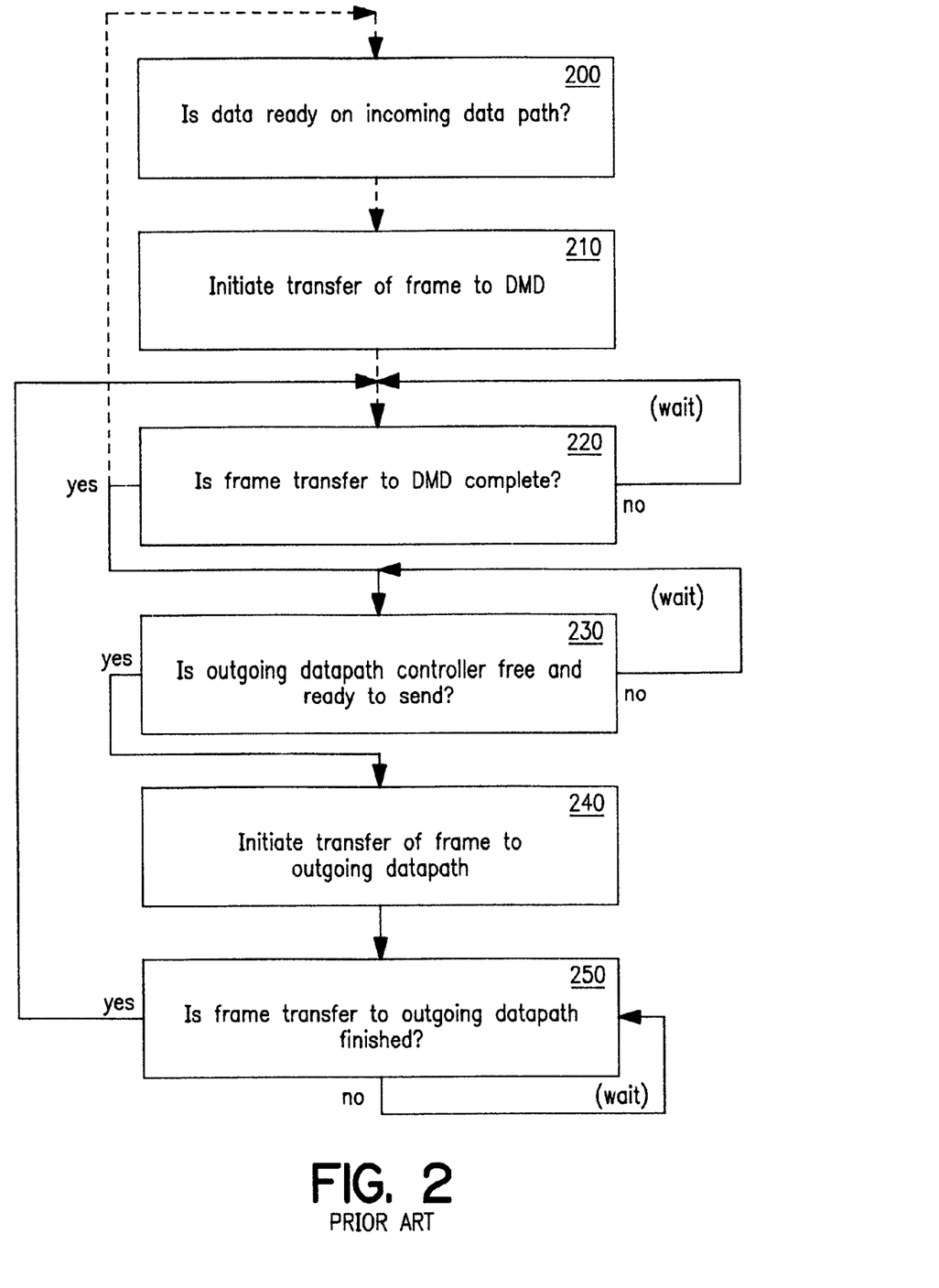
FIG. 2 is a block diagram illustrating the prior art methodology of store and forward with double buffering.

FIG. 2 is a block diagram illustrating the prior art methodology of store and forward with double buffering. A data movement device (DMD) checks to see if data is ready to be transferred on the incoming data path as illustrated by block 200. When there is data ready to be transferred, block 210 initiates a transfer of the entire frame of data to the data movement device once a data buffer becomes available. A frame is a delimited unit of data such as a packet, message, I/O request, etc, and can be any length. Next, the data movement device checks to see if the frame transfer to the DMD is complete as illustrated in block 220. If not, the data movement device waits until the frame transfer is complete. When complete, two events take place simultaneously as illustrated by the dotted line and solid line exiting block 220. One event tells the DMD to start over again at block 200 and check whether there is more data ready on the incoming data path. The other event causes the DMD to test the availability of the outgoing data path controller illustrated in block 230. Once the outgoing data path controller is free and ready to send, block 230 succeeds, the DMD transfers the frame on the outgoing link in block 240. The DMD then waits until the outgoing transfer is complete as illustrated in block 250 before returning to block 220 to await another frame of data to arrive on the DMD from the incoming data path.

Figure 3:
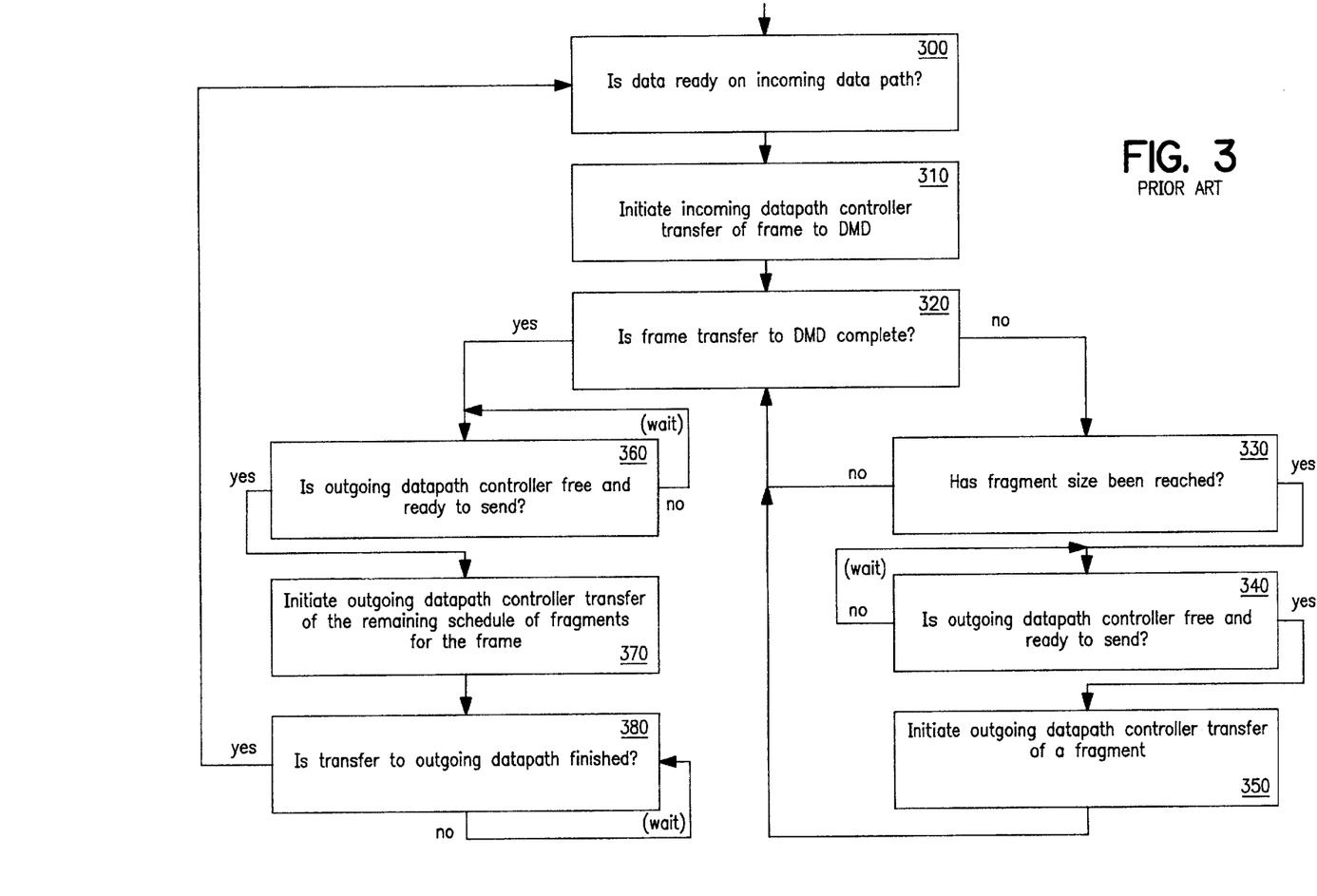
FIG. 3 is a block diagram illustrating the prior art methodology of static fixed/variable fragmentation.

FIG. 3 is a block diagram illustrating the prior art methodology of static fixed and variable fragmentation. This process begins much the same as store and forward. A data movement device (DMD) checks to see if data is ready to be transferred on the incoming data path as illustrated by block 300. When there is data ready to be transferred, block 310 initiates the transfer of the frame of data to the DMD. In these schemes, however, the entire frame need not have arrived into the DMD prior to initiating a transfer from the DMD to the outgoing data path. Block 320 queries whether the incoming frame transfer to the DMD has completed. If it has, block 360 checks to make sure the data path controller for the outgoing path is free and ready to send. Block 370 initiates the transfer of as many individual fragments as make up the remaining data on the DMD, i.e., the DMD transmits the rest of the fragmentation schedule for that frame.

The DMD then waits for that transfer to complete before beginning the cycle anew. If block 320 discovers that the transfer to the DMD has not completed, then block 330 checks to see if the specified fragment size has been received. If not, the DMD waits until an amount of data equal to the fragment size has been received while checking the end of the transfer to the DMD. When the amount of data meets the requisite fragment size, the DMD checks the status of the outgoing data path controller in block 340. If that data path controller is free and ready to send, then block 350 transfers a fragment to the outgoing data path.

The data movement device then returns to block 320 to see if enough new data has arrived for the next outgoing data path transfer. In static fixed/variable fragmentation the outgoing transfers are always equal to the scheduled fragment size (except perhaps the last transfer as the size of the frame may not be evenly divisible by fragment size).

Figure 4:
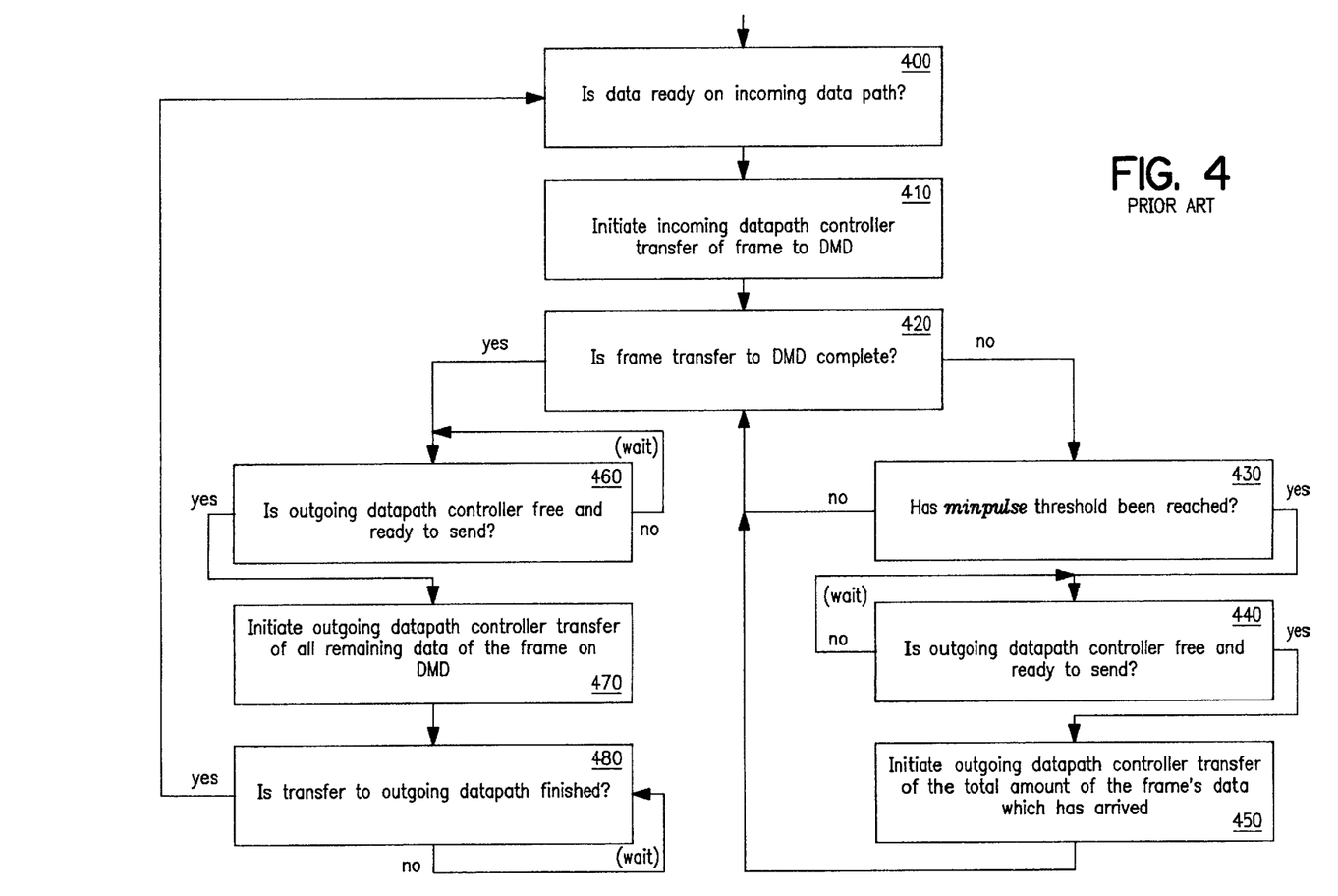
FIG. 4 is a block diagram illustrating the prior art methodology of cut-through delivery.

FIG. 4 is a block diagram illustrating the prior art methodology of cut-through delivery. This process begins much the same as store and forward and static fixed/variable fragmentation. A data movement device (DMD) checks to see if data is ready to be transferred on the incoming data path as illustrated by block 400. When there is data ready to be transferred, block 410 initiates the transfer of the frame of data to the DMD. In these schemes, however, the entire frame need not have arrived into the DMD prior to initiating a transfer from the DMD to the outgoing data path. Block 420 queries whether the incoming transfer to the DMD has completed. At this point everything works the same as in FIG. 3 except for the following. If the transfer of the frame to the DMD has completed, then block 470 will issue a transfer to the outgoing data path of all remaining data of the frame on the DMD. If incoming transfer of the frame has not completed, then Block 430 checks to see if minpulse amount of data, of the frame arriving on the DMD from the incoming data path, has been reached or exceeded. As in FIG. 3, block 440 waits until the outgoing data path is free and ready to send. Then block 450 initiates the transfer of one fragment whose size is equal to the amount of data of the frame that has arrived on the DMD, from the incoming data path, at that point in time.

Figure 5:
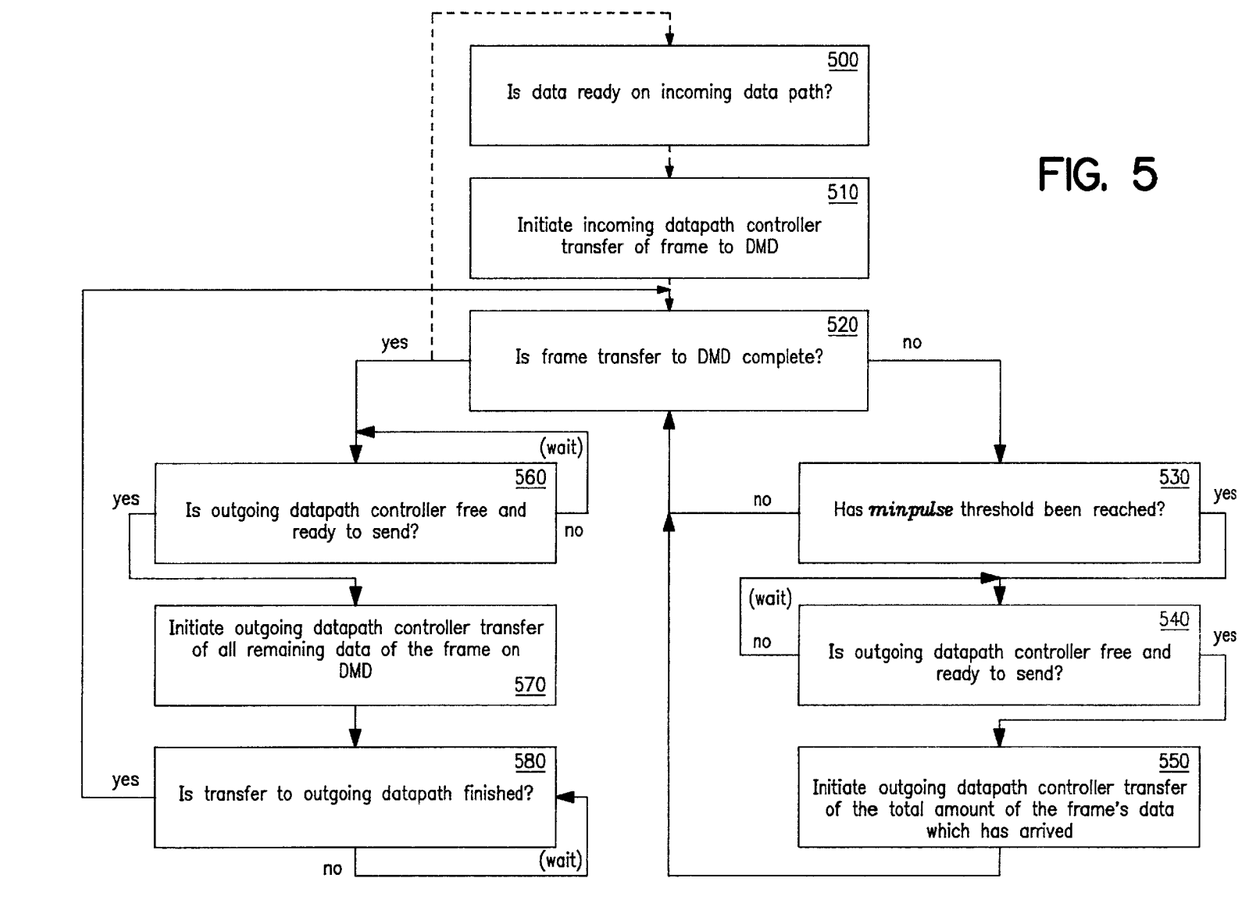
FIG. 5 is a block diagram illustrating the adaptive message pipelining methodology of the present invention.

FIG. 5 is a block diagram illustrating the methodology of the present invention, namely, adaptive message pipelining (AMP). Just as in store and forward, static fixed/variable fragmentation, and cut-through delivery, adaptive message pipelining performs the same two initial steps. The data movement device (DMD) checks to see if data is ready to be transferred on the incoming data path as illustrated by block 500. When there is data ready to be transferred, block 510 initiates a transfer of the frame of data to the data movement device once a data buffer becomes available. Block 520 checks to see if the entire frame transfer has completed. At this point everything works the same as in FIG. 4 except for the following. When block 520 discovers that the entire frame transfer has completed, control passes to both blocks 560 and 500 (as indicated by the solid and dashed lines). When block 580 discovers that the last of the frame has completed its transfer to the outgoing data path, then control is given to block 520. These two key differences allow double buffering to be used with cut-through delivery. Data path controllers for moving data to the DMD from the incoming data path and for moving data from the DMD to the outgoing data path may now operate in parallel for either the same or different frames.

Adaptive message pipelining's reference implementation exists within the Trapeze messaging system for Myrinet. It is implemented as a host-side API and a firmware program for Myrinet network interface cards. In this implementation of AMP, the network interface card (NIC) is the data movement device (DMD), the host's I/O bus is both an incoming and an outgoing data path, and the network link is both an incoming and outgoing data path. Direct memory Access (DMA) engines, which reside on the network interface card, possess sufficient capabilities for adaptive message pipelining. In particular the DMA engines allow transfers to and from the network interface card to occur simultaneously. They also throw interrupts (on the network interface card) when transfers are complete, allow data arriving on the network interface card to be utilized during a transfer, allow the network interface card to view the number of bytes which have arrived so far, and can delimit outgoing transfers via tail-flits(to the network link) or PCI I/O bus transfer completions.

Figure 6A:
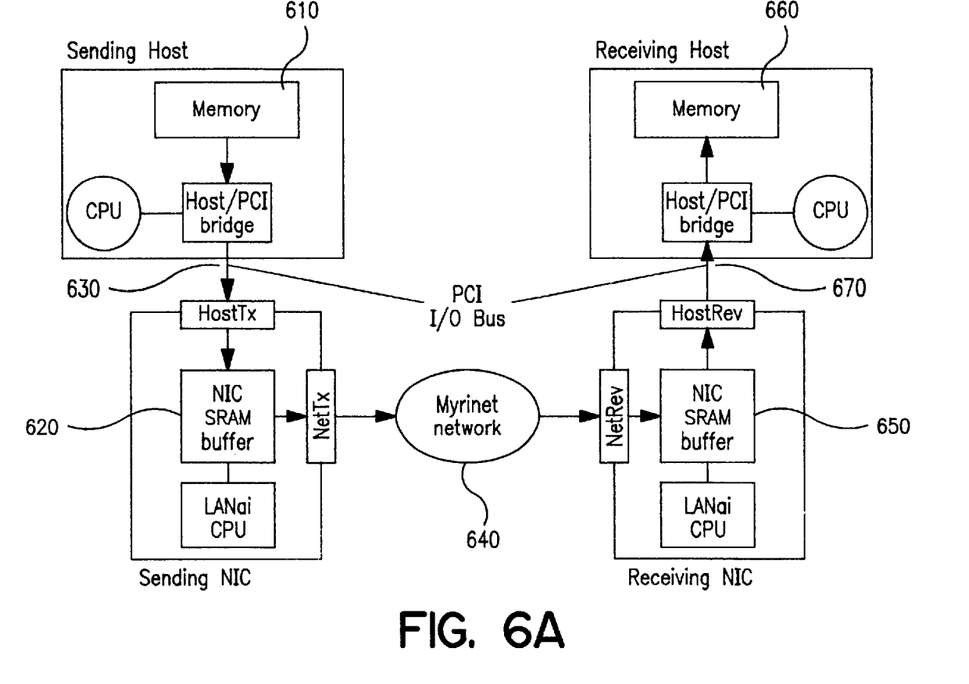
FIG. 6A is a schematic diagram illustrating four send and receive Direct Memory Access (DMA) transfers through DMA engines on the network interface card.
Figure 6B:
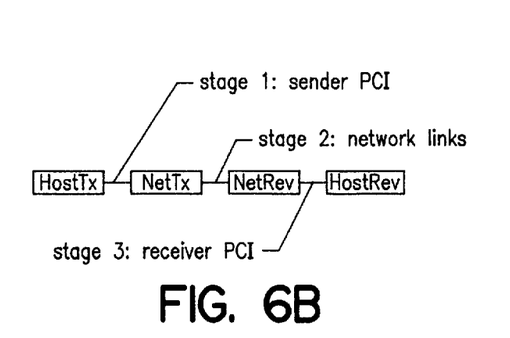
FIG. 6B is a schematic diagram illustrating transfers between stages in a three-stage pipeline model.

Adaptive message pipelining reduces latency by overlapping stages of data transfers for frames. In a typical network, such as Myrinet, four Direct Memory Access (DMA) transfers through DMA engines on the network interface card (NIC) are required to both send and receive a packet. This is illustrated in FIG. 6A. The first transfer is from host memory 610 to NIC memory 620 across the sending hosts peripheral component interconnect (PCI) I/O bus 630. Second is the transfer from NIC memory 620 to the network link 640. The third and fourth transfers are symmetric to the second and first respectively, i.e., network link 640 to NIC memory 650, and NIC memory 650 to host memory 660 across the receiving host's PCI I/O bus 670. The corresponding network interface card DMA engines are referred to as HostTx, NetTx, NetRcv, and HostRcv respectively. Transfers through components that never introduce store-and-forward delays, such as the host/PC bridges, the NetRcv engine, and the wormhole-routed Myrinet network switches are ignored in this analysis. Network interface card firmware controls all transfers between stages in the resulting three-stage pipeline model illustrated in FIG. 6B.

Figure 7A:
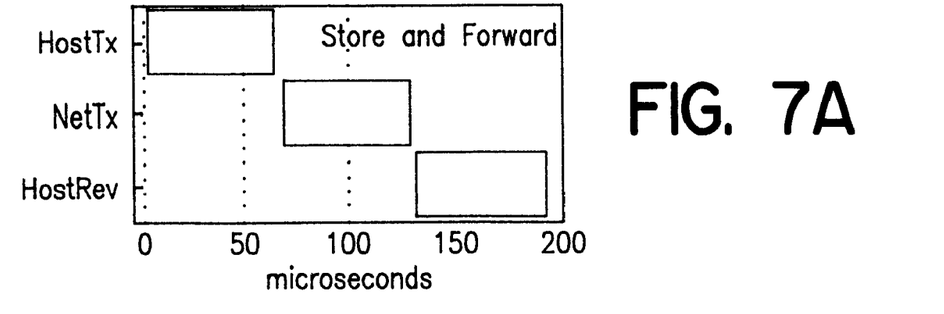
FIGS. 7A–7C are graphs illustrating how message pipelining alternatives (store and forward, static fixed, and static variable) decrease latency.
Figure 7B:
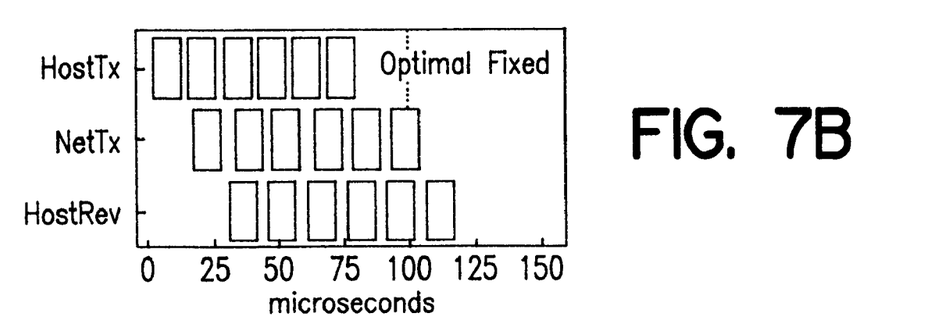
Figure 7C:
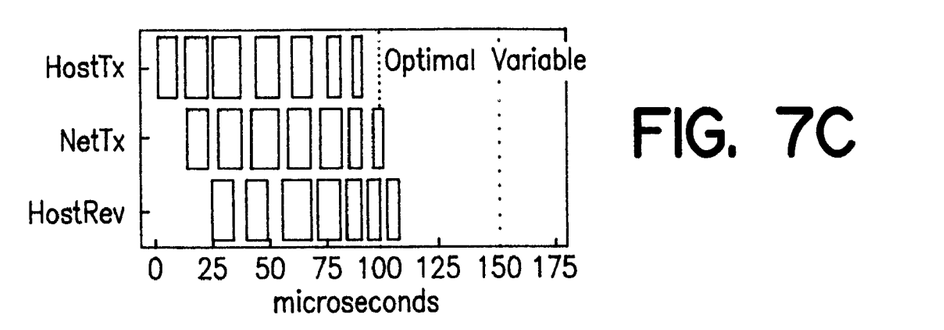

FIGS. 7A–7C illustrate how fragmentation decreases latency. The simplistic approach, illustrated in FIG. 7A, is to send the message as a single packet with store-and-forward delay in between each pipeline stage. Static fixed fragmentation is illustrated in FIG. 7B, and static variable fragmentation is illustrated in FIG. 7C. Both FIGS. 7B and 7C decrease latency by overlapping the transfer time in the different stages of the pipeline.

Fragments may be sent as separate packets on the network and reassembled at the destination (delimited fragmentation). Transmission of a fragment through a pipeline stage, i, cannot begin until the entire fragment exits the previous stage, i−1. The optimal strategy for both static fixed and static variable fragmentation methodologies can be determined given two parameters for each stage (i), namely, the fixed per-transfer overhead $g_i$, and the inverse throughput (time per unit of data) $G_i$. FIGS. 7B and 7C illustrate fragment schedules derived from such an analysis.

Figure 8:
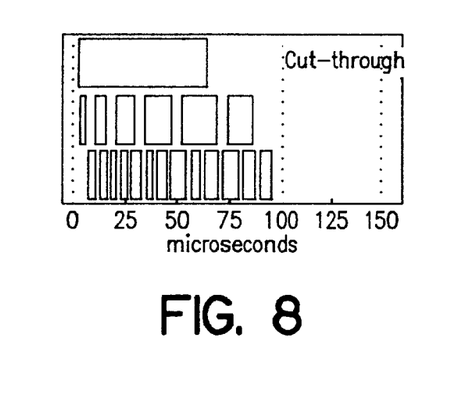
FIG. 8 is a graph illustrating the present invention of adaptive message pipelining.

FIG. 8 graphically illustrates cut-through delivery as derived via simulation.

AMP places control of all pipelining within the pipeline itself, hidden within the DMD or network interface cards in the case of Trapeze, the reference implementation. Trapeze takes advantage of properties of the Myrinet network, some of which were outlined previously. In particular, Myrinet permits a network interface card to transmit a packet on the link as a sequence of separate, non-delimited, transfers. Myrinet network switches and the receiving network interface card recognize all data placed on the network link by the sender as a continuation of the current packet until the sender transmits a tail flit to mark the end of the packet (delimited frames). The receiver does not receive any part of any other packet until the tail flit arrives. Reassembly is trivial, and fragments cannot be dropped independently.

On the receiving side, adaptive message pipelining is network independent since cut-through transfers are on the host PCI I/O bus, not the network. On the sending side, adaptive message pipelining can be used on any type of network that allows variable-sized delimited or non-delimited fragmentation of a packet or frame.

Trapeze firmware implements AMP by initiating transfers to outgoing data paths whenever the amount of data buffered on the network interface card awaiting transfer to that data path exceeds a configurable threshold (minpulse). When the firmware initiates a transfer, it transfers all of the data it has buffered for the current packet.

AMP offers compelling benefits over other pipelining strategies. In particular, it produces near-optimal pipeline schedules automatically, because it naturally adapts to different G and g values at each stage (i). For example, if a fast source feeds a slow data path, data builds up on the network interface card buffers, triggering larger transfers through the bottleneck, reducing the total per-transfer overhead. Similarly, if a slow source feeds a fast data path, the policy sends a sequence of minpulse-size transfers that use the idle data path throughput to minimize latency. Higher overheads do not matter because throughput is bounded by the slow source.

Adaptive message pipelining naturally produces the right pipelining behavior by utilizing buffer queues on the network interface cards. In addition to absorbing bursts and allowing overlapped transfers of separate packets through double buffering, buffer queues allow the adaptive behavior of cut-through delivery to carry over to subsequent packets headed for the same data path. If a leading packet encounters a queuing delay, more of the data from trailing packets accumulates in the network interface card buffer queue during the delay. Since each transfer to an outgoing data path always carries as much data as the network interface card has buffered for the packet, buffering triggers larger transfers, helping to compensate for the delay.

Figure 9:
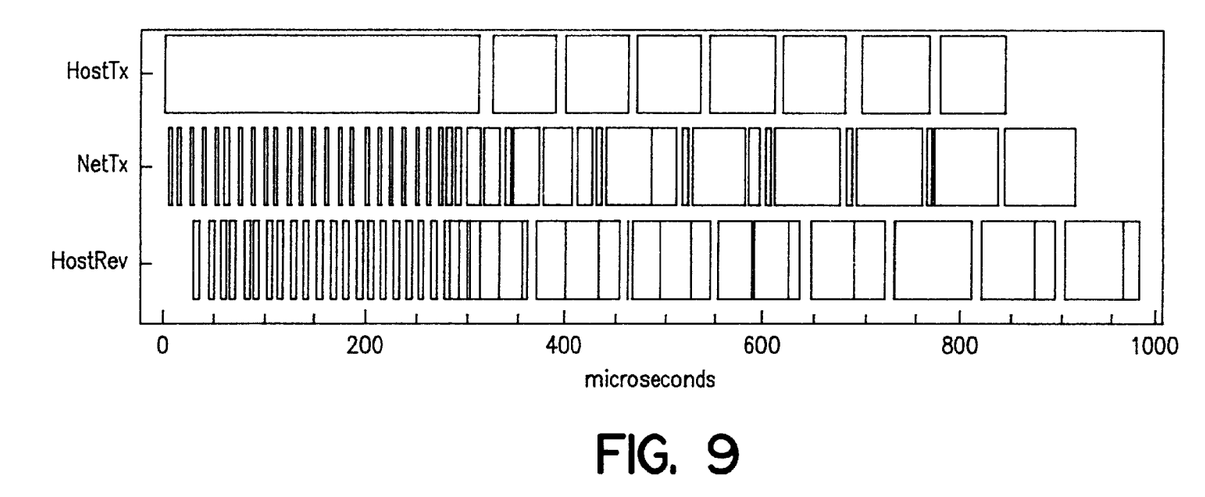
FIG. 9 is a graph illustrating a snapshot of AMP derived from the reference implementation in action for a stream of 8KB frames.

Since pipelining itself causes delays due to per-transfer g costs, the system naturally degrades to store-and-forward for continuous streams of packets. FIG. 9 illustrates this effect for a stream of 8KB packets whose schedule was logged from the reference implementation. Transfers for successive packets are represented with alternating shadings. All consecutive stripes with the same shading represent transfers for the same packet. The width of each vertical stripe indicates the duration of the transfer, as determined by a cycle counter on the network interface card. If there is no contention, this duration is proportional to the size of the transfer (e.g., it is $G_rB$). In practice, hostTx and hostRcvtransfers on the host I/O buses may take longer if another I/O device (or the CPU) contends for the I/O bus, or if the CPU demands host memory throughput. Similarly, netTx transfers on Myrinet may stall due to memory throughput limitations on the network interface card, or to back-pressure flow control in the Myrinet link interfaces and switches. Back-pressure may occur due to competition for a shared link from another sender, or if the receiving network interface card does not consume data from the link fast enough.

Since the network interface card buffer queues allow increasing transfer sizes to carryover to subsequent packets, the receiver gradually drops out of cut-through delivery as it comes under load and the amount of data buffered on each network interface card increases.

The foregoing description has been illustrated using the Myrinet messaging system. It is to be understood by those skilled in the art that use of the Myrinet messaging system is for illustrative purposes only. The present invention is capable of being implemented within other network systems that allow fragmentation of a packet or frame including, but not limited to, ATM(on the receiving side), various Ethernet technologies (10/100 base T, gigabit), etc. The fact that the reference implementation was constructed as firmware on a programmable network adapter does not limit the invention to adapters or DMDs with that ability. Adaptive message pipelining may also be implemented as a policy in hardware by those of ordinary skill in the art.

It will be understood that various details of the invention may be changed without departing from the scope of the invention. Furthermore, the foregoing description is for the purpose of illustration only, and not for the purpose of limitation--the invention being defined by the claims.

What is claimed is:

1. On a network interface card, a data movement device having an incoming side and an outgoing side, said data movement device for implementing a management policy to decrease latency and maximize data throughput based on the characteristics of data paths connected to the data movement device, said data movement device comprising:
   (a) a plurality of data paths;
   (b) a plurality of data buffers for storing data received from said plurality of data paths; and
   (c) a plurality of data path controllers for initiating transfers of data to and from said plurality of data paths, wherein
      one of said data path controllers initiates a transfer of a frame of data from an incoming data path to a data buffer on said data movement device,
      determines the amount of data within the frame of data that has already been received in the data buffer, and
         if the entire frame of data has been received, transfers the rest of the frame of data to an outgoing data path while simultaneously readying the data movement device for reception of another data frame from an incoming data path, otherwise,
      the data movement device waits until the amount of the frame's data that has already been received into the data buffer meets or exceeds a threshold level, then transfers all data currently buffered to an outgoing data path, and repeats the process starting at the point where the data movement device determines the amount of data within the current frame of data that has already been received in the data buffer.

2. The system of claim 1 wherein the data path controllers are managed transparently, to a host, by a network adapter.

3. The system of claim 1 in which, for every outgoing data path controller transfer, the system waits until the outgoing data path controller is free and ready to send.

4. The system of claim 2 in which, for every outgoing data path controller transfer, the system waits until the outgoing data path controller is free and ready to send.

5. A data movement device having an incoming side and an outgoing side, said data movement device for implementing a management policy to decrease latency and maximize data throughput based on the characteristics of data paths connected to the data movement device, said data movement device comprising:
   (a) a plurality of data paths;
   (b) a plurality of data buffers for storing data received from said plurality of data paths; and
   (c) a plurality of data path controllers for initiating transfers of data to and from said plurality of data paths, wherein
      one of said data path controllers initiates a transfer of a frame of data from an incoming data path to a data buffer on said data movement device,
      determines the amount of data within the frame of data that has already been received in the data buffer, and
         if the entire frame of data has been received, transfers the rest of the frame of data to an outgoing data path while simultaneously readying the data movement device for reception of another data frame from an incoming data path, otherwise,
      the data movement device waits until the amount of the frame's data that has already been received into the data buffer meets or exceeds a threshold level, then transfers all data currently buffered to an outgoing data path, and repeats the process starting at the point where the data movement device determines the amount of data within the current frame of data that has already been received in the data buffer.

6. The system of claim 5 wherein a subset of said plurality of data paths is connected to a network link on either the incoming or the outgoing side of the data movement device.

7. The system of claim 6 wherein the data path controllers are managed transparently, to a host, by a network adapter.

8. The system of claim 5 in which, for every outgoing data path controller transfer, the system waits until the outgoing data path controller is free and ready to send.

9. The system of claim 6 in which, for every outgoing data path controller transfer, the system waits until the outgoing data path controller is free and ready to send.

10. A method of adjusting the management policy of a data movement device along a continuum between a cut-through fragmentation policy and a store and forward policy, said adjusting based on the characteristics of data paths connected to the data movement device, said method comprising the steps of:
   (a) commencing transfer of a frame of data from an incoming data path to the data movement device once there is a frame of data ready to be transferred present on the incoming data path;
   (b) determining the amount of data within the frame of data that has been received onto the data movement device, and
      (b)(1) if the entire frame of data has been received, simultaneously transferring the data in the data movement device to an outgoing data path and returning to step (a), or (b)(2) if the entire frame of data has not been received, waiting until the amount of the data within the frame of data that has already been received in the data movement device meets or exceeds a threshold level;

(b)(3) transferring all data already received in the data movement device to an outgoing data path once the threshold level has been reached; and (b)(4) returning to step (b).

11. The method of claim 10 wherein instep (b), the data path controllers are managed transparently to a host by a network adapter.

12. The method of claim 10 wherein step (b)(2) further comprises the step of waiting until the outgoing data path controller is free and ready to send.

13. The method of claim 11 wherein step (b)(2) further comprises the step of waiting until the outgoing data path controller is free and ready to send.

14. A computer program product for adjusting the management policy of a data movement device along a continuum between a store and forward policy and a cut-through fragmentation policy, said adjusting based on the characteristics of data paths connected to the data movement device, the computer program product having a medium with a computer program embodied thereon, the computer program product comprising:

(a) computer program code for commencing transfer of a frame of data from an incoming data path to the data movement device once there is a frame of data ready to be transferred present on the incoming data path;

(b) computer program code for determining the amount of data within the frame of data that has been received in the data movement device, and (b)(1) if the entire frame of data has been received, simultaneously transferring the data in the data movement device to an outgoing data path and getting ready to commence transfer of another frame of data from an incoming data path, or (b)(2) if the entire frame of data has not been received, waiting until the amount of the data within the frame of data that has already been received in the data movement device meets or exceeds a threshold level;

(b)(3) transferring all data already received in the data movement device to an outgoing data path once the threshold level has been reached and repeating until the entire frame of data has been sent, then getting ready to commence transfer of another frame of data from an incoming data path.

15. The method of claim 14 wherein step (b)(2) further comprises the step of waiting until the outgoing data path controller is free and ready to send.

* * * * *

UNITED STATES PATENT AND TRADEMARK OFFICE
CERTIFICATE OF CORRECTION

| | | |
|---|---|---|
| PATENT NO. | : 6,308,228 B1 | Page 1 of 1 |
| APPLICATION NO. | : 09/197598 | |
| DATED | : October 23, 2001 | |
| INVENTOR(S) | : Yocum et al. | |

It is certified that error appears in the above-identified patent and that said Letters Patent is hereby corrected as shown below:

The correction is to page 1, lines 3-4 between the title and TECHNICAL FIELD. Applicant respectfully requests that the following paragraph be inserted:

--GRANT STATEMENT

This invention was made with Government support under Grants CCR-96-24857 and CDA-95-12356 awarded by the National Science Foundation. The Government has certain rights in the invention.--

Signed and Sealed this

Twenty-seventh Day of May, 2008

JON W. DUDAS
*Director of the United States Patent and Trademark Office*